United States Patent [19]
Bramnick et al.

[11] Patent Number: 5,745,766
[45] Date of Patent: Apr. 28, 1998

[54] PC PRODUCT REGISTRATION AND TRACKING

[75] Inventors: Arnold H. Bramnick, Boca Raton, Fla.; Nathaniel Calvert, Rochester, Minn.; Thomas Marcus McBride, Rochester, Minn.; Arthur Frank Snyder, III, Rochester, Minn.; John Robert Ure, Coral Springs, Fla.

[73] Assignee: International Business Machines Corporation, Armonk, N.Y.

[21] Appl. No.: 308,190

[22] Filed: Sep. 19, 1994

[51] Int. Cl.[6] .................................................. G06F 9/45
[52] U.S. Cl. ............................................................ 395/703
[58] Field of Search .............................. 395/700, 200, 395/600, 612, 703, 650, 500; 364/300, 200, DIG. 1, DIG. 2

[56] References Cited

U.S. PATENT DOCUMENTS

| | | |
|---|---|---|
| 5,023,907 | 6/1991 | Johnson et al. |
| 5,237,688 | 8/1993 | Calvert et al. ........................ 395/700 |
| 5,287,504 | 2/1994 | Carpenter et al. .................... 395/617 |
| 5,333,315 | 7/1994 | Saether et al. ........................ 395/600 |
| 5,341,478 | 8/1994 | Travis, Jr. et al. ................. 395/200.03 |

Primary Examiner—Alvin E. Oberley
Assistant Examiner—Peter J. Corcoran, III
Attorney, Agent, or Firm—David A. Mims, Jr.; Romualdas Strimaitis

[57] ABSTRACT

A method for application registration and tracking for DOS and OS/2 software, independent of the mechanism in which the application is distributed and installed. The invention allows other application registration and tracking techniques to co-exist without affecting/impacting each other. This truly is an "open" packaging, registration and tracking invention which allows PC-software to be better managed in a network.

25 Claims, 5 Drawing Sheets

FIG. 4

LP Transport Format:

| Application ZIP Files Contain: o Application Files o LP Description Files | Install Program | LP Description File o DMI-ECS-LP Instance Description File o DMI-ECS-LP Load Instance Description File |

LP Load/Install Format:

| Drive/Directory/SubDir o DMI-ECS-LP Instance Description File o DMI-ECS-LP Load Instance Description File o LP Application Files |

FIG. 5

LP Transport Format:

| Application Fix ZIP Files Contain: ○ Application Fixes ○ LP-Fix Description File | Install Program | LP-Fix Description File ○ DMI-ECS-LP-Fix Instance Description |

LP Load/Install Format:

Drive/Directory/SubDir:
○ DMI-ECS-LP-Fix Instance Description File
○ LP Application Fixes

PC PRODUCT REGISTRATION AND TRACKING

FIELD OF THE INVENTION

This invention relates to a method of managing computer software. More specifically, this invention relates to registering and tracking replaceable software units configured in a multi-level hierarchical system.

The present invention uses the basic packaging structure of U.S. Pat. No. 5,237,688, entitled SOFTWARE PACKAGING STRUCTURE HAVING HIERARCHICAL REPLACEABLE UNITS, commonly assigned and hereby incorporated by reference.

The U.S. Pat. No. 5,237,688 patent is directed to a method for identifying how an application may be converted to a "packaged application" via a set of machine functions. The present invention uses the benefits of this packaging technique to provide a new way to track software units.

BACKGROUND OF THE INVENTION

Today software on a PC may be installed from many sources via electronic media (e.g. online, databases, networks, services, bulletin boards, etc.) or magnetic/optical media (e.g. floppy disks, CD-Rom, etc). It is desirable to register and track software when it is installed to insure that software registration licenses are not violated. Owners and/or users of distributed applications would like to know the exact maintenance level of distributed software so that a central site can determine if the latest version of the software exists on a particular PC. The PC must have some mechanism of registering and tracking software which is resident on the PC. To accomplish this, the application registration and tracking facility must track the movement of the applications' files within the PC's directories and sub-directories. The prior art has failed to provide for an automatic method for tracking distributed and/or hierarchical software units.

The software units of the present invention may be software application packages made up of several linked replaceable units (RU). Each RU is serviceable without adversely effecting the other RUs. RUs are linked together in a hierarchical fashion in a series of levels. In the preferred embodiment, five levels are used: Application Group level (AG), Loadable Code Group level (LCG), Primary Functional Group level (PFG), Secondary Functional Group level (SFG) and Operational Code Group level (OCG). The AG level defines a group of computer programs combined to perform a high level application tailor fit to meet the needs of the user. The LCG level defines individual programs each created to perform a general task. The PFG level refines the common programs defined in the LCG level to a more specific set of primary functions. The SFG level refines the primary functions defined in the PFG level to an even more specialized set of secondary functions tailored closely to fit a specific user's needs. The OCG level contains the operational code needed to run the specialized user application package defined by the preceding four levels. A more complete discussion of packaging techniques is provided for in the U.S. Pat. No. 5,237,688.

The present application may reference terms that are different than the terms specifically defined in patent U.S. Pat. No. 5,237,688. The following is a mapping of terms defined in this application to those defined in the referenced patent.

Application Group (AG) is equivalent to a Suite of Licensed Programs (LPs)

Loadable Code Group (LCG) is equivalent to an ECS-LP or a product

Primary Functional Group (PFG) is equivalent to all ECS-LP Loads with the same functional group ID (Feature ID).

Secondary Functional Group (SFG) is equivalent to a specific optional load which may contain both translated software (NLV) and nontranslated software. The SFG is therefore equivalent to the ECS-LP-Load which may be translated or non-translated. The Operational Code Group (OCG) is equivalent to functional files shipped with a translated or non-translated ECS-LP-Load. FIG. 1 illustrates how packaging in the present application maps to that defined in the referenced patent (U.S. Pat. No. 5,237,688).

SUMMARY OF THE INVENTION

It is an object of the present invention to automatically manage software.

It is further an object of the present invention to manage packaged software in a hierarchical file system.

It is further an object of the present invention to manage software in a client/server, network and/or distributed systems environment.

It is further an object of the present invention to automatically register and track software as it is loaded and/or moved throughout a hierarchical file structured system.

The present invention defines a mechanism for registering and tracking packaged applications on a hierarchical file system environment (i.e. DOS, OS/2) but should not be limited thereto. The present invention provides for a specific operating system implementation for an application registration and tracking API (ARTA) which allows a product (i.e. ECS-LP) tracking system to "know" about the software installed on the PC independent of the directory or sub-directory in which the application exists. The disclosure also provides flexibility in allowing an application to be installed into a customer targeted directory without compromising its ability to be registered and or tracked.

This present invention is dependent on the ability to package an application with control information containing the software packaging structures of the U.S. Pat. No. 5,237,688. The design further allows a PC application to be packaged without recompilation of the existing PC application. The packaging control structure is assigned a distinguishing file suffix.

BRIEF DESCRIPTION OF THE DRAWINGS(S)

FIG. 1 ECS-LP Packaging Structures. An Electronic Customer Support (ECS) enabled Licensed Program (LP) is packaged according to this figure.

FIG. 4 illustrates Electronic Customer Support(ECS)-Licensed Program(LP) packaging formats.

FIG. 5 illustrates ElectronicCustomerSupport(ECS)-Licensed Program(LP) fix packaging formats.

DETAILED DESCRIPTION

Figure 1:
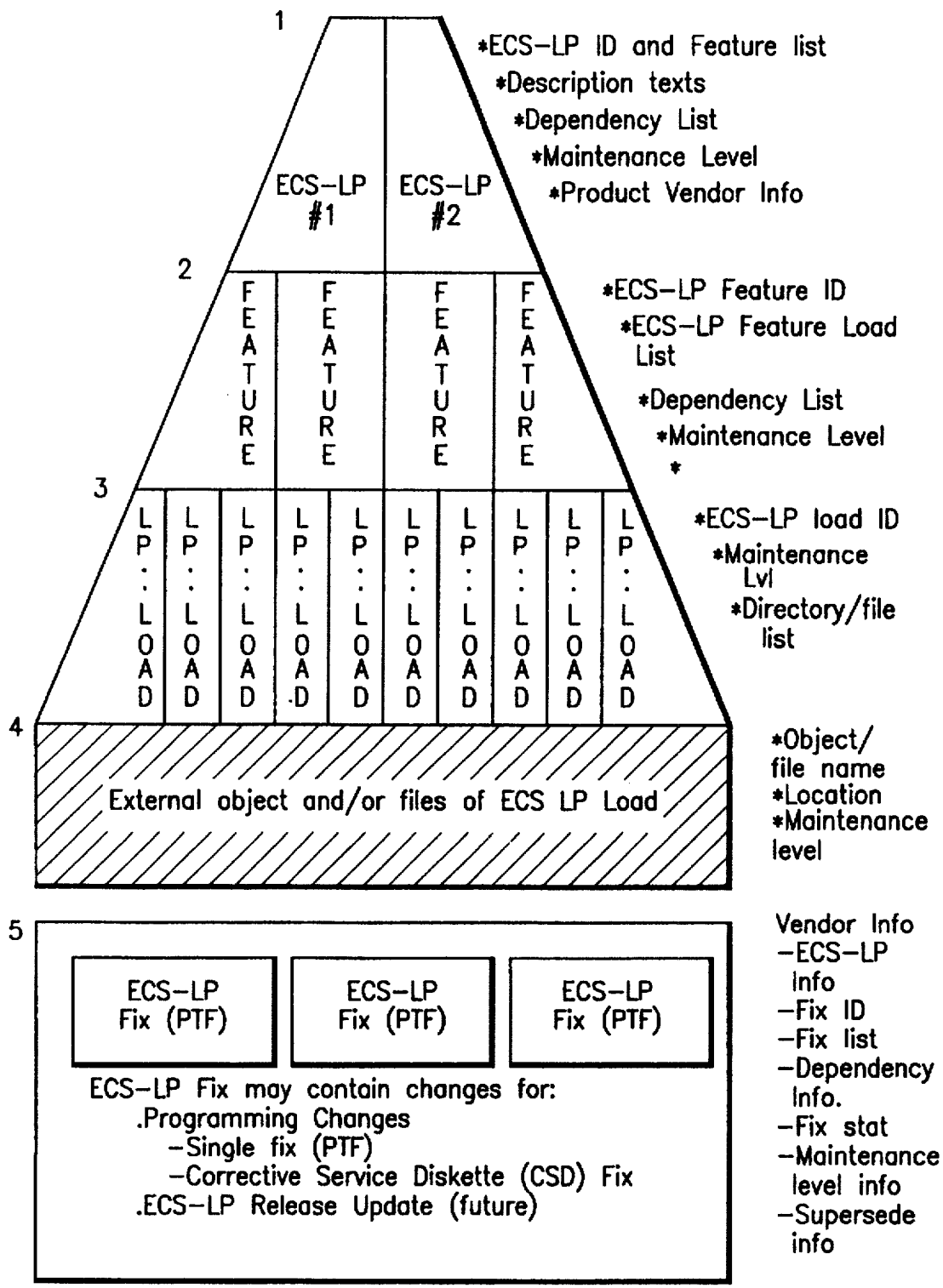

The present invention manages and tracks packaged software units implemented in a typical DOS or OS/2 environment, but should not be limited thereto. It is envisioned that the present techniques could be modified to be useful in any operating system.

A DOS or OS/2 operating system provides an interface to intercept all modifications to directories. Modifications include create, rename, delete or a combination of either. A DOS or OS/2 operating system further provides an interface to intercept all file create, rename, delete and move operations.

For DOS the intercept will be done via an interrupt handler, supplied by ARTA, which monitors for the aforementioned instructions. For OS/2 the intercept will be done by the OS which monitors for the API and determines if the ARTA intercept handler has been activated in the system. ARTA will build a product directory for all locally attached directories which contain a PRD file suffix. The PRD suffix is an arbitrary value determined and set by a packaging suffix manager. It could be any value. The file containing the suffix name is flagged as containing LP description information or LP Fix description information. Note, ARTA ensures that files which have a suffix name of PRD contain the correct format prior to updating the ARTA product directory.

The following functions are performed, by the ARTA intercept handler according to the operation being performed:

- a. Copy of a Directory which contains a file name which contains a PRD suffix.
- b. Rename of a directory which contains a file name in which contains the PRD Suffix
    Update the ARTA product directory to reflect the new directory which contains the PRD File Suffix
- c. Creation of a file which has a suffix name PRD
    Validate that the file with the PRD File Suffix contains packaging information. If it does, update the ARTA product directory.
- d. Rename of a file which contains a PRD File Suffix name
    Update the prefix file name in the ARTA product directory. If the PRD File Suffix is renamed, remove the product from the ARTA product directory.
- e. Delete of a file which contains a PRD File Suffix name.
    Remove the file from the ARTA product directory.

ARTA also provides a retrieve product data API which allows another operating system program to retrieve product information from the ARTA product directory.

DESCRIPTION OF THE ILLUSTRATIVE EMBODIMENT(S)

ECS-LP Functional Packaging and Registration

The preferred embodiment of the present invention uses the packaging techniques as disclosed in the U.S. Pat. No. 5,237,688.
Electronic Customer Support(ECS) enabled Licensed Program(LP)(ECS-LP) Functional Package Electronic Customer Support(ECS) enabled Licensed Program(LP)(ECS-LP) Functional Package supports Primary and Secondary Features/Options. The Primary Feature contains an LP instance Description. All Options of any Feature will contain one or more LP Load instance Description files. There will be one for non-translatable load instance (code) and one for each translatable load instance (NLV). The ECS-LP packaging may be done without recompiling functional files of the application/ECS-LP.

ECS-LP Registration Facility

The ECS-LP Registration Facility allows multiple instances of an ECS-LP to exist in Transport state and further allows multiple instances of an ECS-LP to exist in a Loaded state. Under certain circumstances, the ECS-LP Registration Facility allows multiple instances of an ECS-LP to exist in the Installed state. Multiple instances will be allowed in the installed state if:

1. ECS-LP is enabled for ECS-LP replication (Multiple versions of ECS-LP with the same maintenance level installed at the same time) or
2. ECS-LP is enabled for multiple versions of the ECS-LP installed on the system with different maintenance levels.

Figure 2:
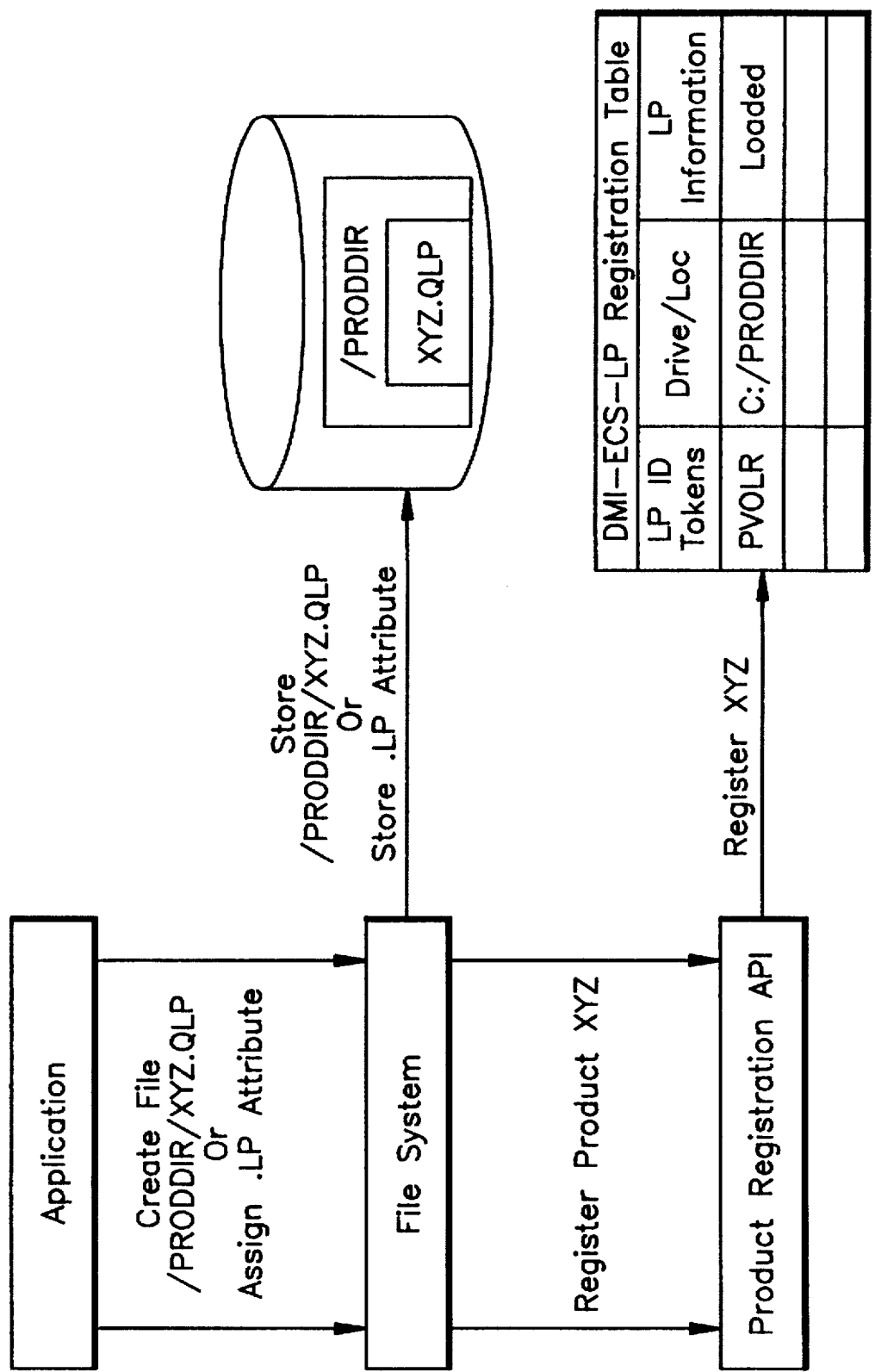
FIG. 2 illustrates a general flowchart of the registration technique of the present invention.

ECS-LP Registration API is activated each time the path to a LP instance is changed (renamed/moved/deleted). The Registration Facility works with local drives, network drives, and removable media or other equivalent means.
ECS-LP Release Package Registration Flow The following is a typical flow for the Creation of an ECS-LP Release Package:

Use desk top tool kit to assemble ECS-LP functional files;
Use ECS-LP packaging APIs to create ECS-LP Instance Description file (Creation registers the description);
Use ECS-LP packaging APIs to create ECS-LP Load Instance Description File(s);
One ECS-LP Load Operation File for non-translatable software (code);
One ECS-LP Load Description File for translatable software (NLV) if the software is language sensitive;
The Creation function registers the ECS-LP description file(s) is shown in FIG. 2, wherein:
    the PRD Extension of ECS-LP File attribute triggers File System;
    the File System calls ECS-LP Registration API;
    the ECS-LP Registration API updates a ECS-LP Registration Table.
All files are packaged into a distribution transport directory;
Add installation facility to ECS-LP in the Transport format to the Install format;
Add ECS-LP Instance Description file and ECS-LP Load Instance File/s to a distribution transport directory, see FIG. 4. This registers the ECS-LP description file/s with the ECS-LP transport format.
Distribute ECS-LP in Transport format include any of the following—CD-ROM image, Diskette image, Electronically or any equivalent means;
Install ECS-LP from Transport format by:
    using an installation facility which extracts and installs functional files from the transport format. The installation facility also installs the ECS-LP Description files;
    zipped ECS-LP Instance Description files which are also unzipped and installed from ECS-LP Transport format by desk top Common Installer.

Figure 3:
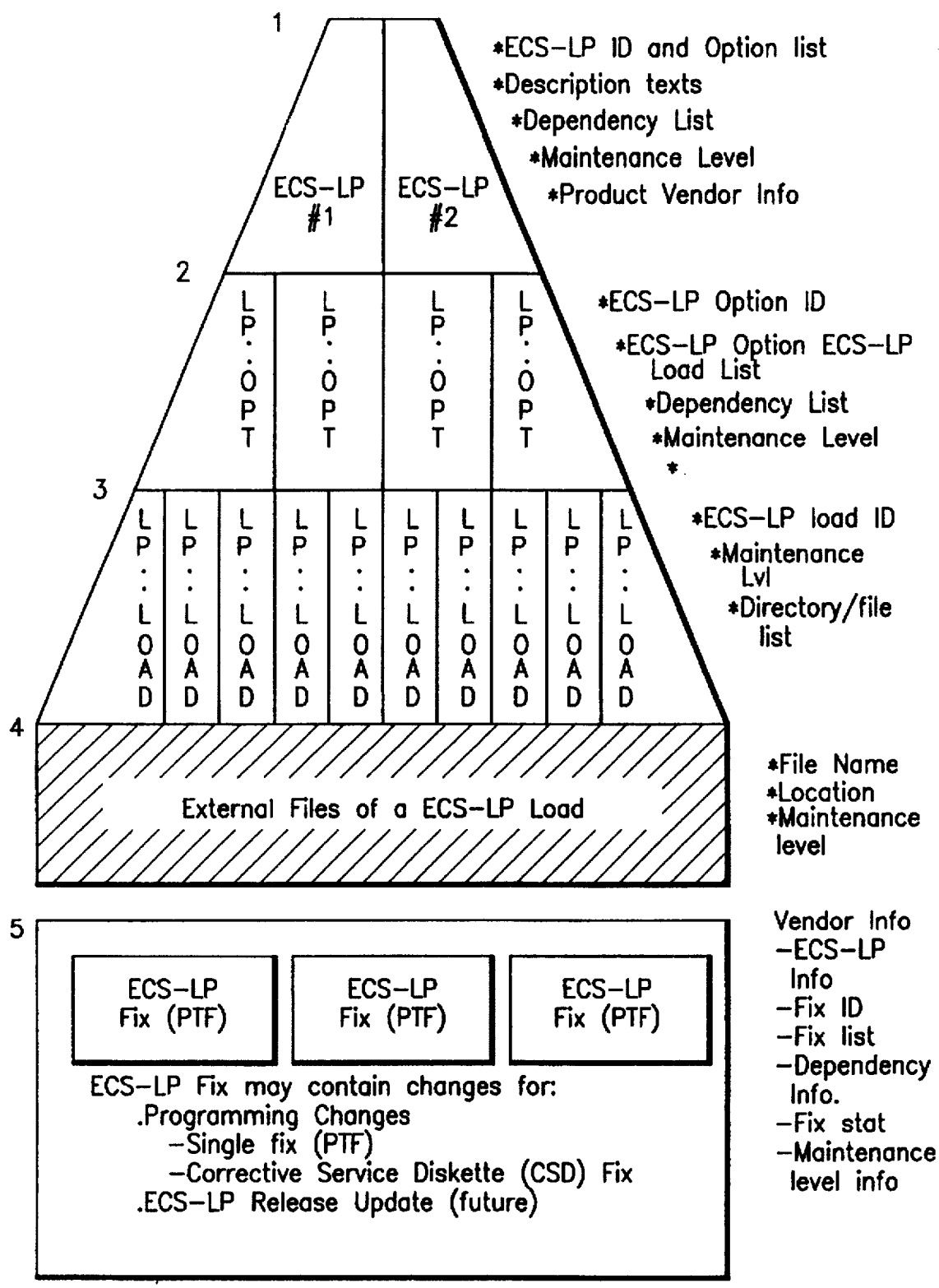
FIG. 3 illustrates the packaging technique of an Electronic Customer Support(ECS) enabled Licensed Program(LP).

This above sequences register the ECS-LP description file(s) installed with ECS-LP. See FIGS. 2 and 4.
LP Fix Packaging A possible format of a ECS-LP fix package is defined in FIG. 5. The possible format contents of a ECS-LP Fix package required for registration is defined therein. The ECS-LP fix package may be applied to any ECS-LP Load as shown in FIG. 3 and outlined below:

Fix to a ECS-LP Load will contain on LP Fix Description;
A fix can be for a replaceable unit (file) in a:
    Non-translatable ECS-LP Load (Code)
    Translatable ECS-LP Load (NLV)

ECS-LP Fix Registration Facility

The ECS-LP Fix Registration Facility allows multiple instances of an ECS-LP Fix to exist in Transport state. The ECS-LP Fix Registration Facility further allows multiple instances of an ECS-LP Fix to exist in Loaded state. In certain circumstances, multiple instances of an ECS-LP Fix exist in the Installed state if:

1. ECS-LP is enable for ECS-LP replication (Multiple versions of ECS-LP with the same maintenance level installed at the same time), or
2. ECS-LP is enabled for multiple versions of the ECS-LP installed on the system with different maintenance levels.

ECS-LP Registration API is activated each time the path to a LP Fix Description is changed (e.g. renamed/moved/deleted). Please note, the Registration Facility works with local drives, network drives, removable media or other equivalent means.

Create ECS-LP Fix Package

The following descriptions provide an outline for the creation of an ECS-LP Fix Package:

Use desk top tool kit to assemble ECS-LP functional files to be fixed;

Use ECS-LP packaging APIs to create ECS-LP Fix Instance Description file(Creation registers the description);

Creation registers the ECS-LP Fix description file(s):
PRD Extension or ECS-LP Fix File attribute triggers File System
File System calls ECS-LP Registration API
ECS-LP Registration API updates ECS-LP Registration Table. (See FIG. 2)

Package all Fix files into a distribution transport directory;
Add installation facility to ECS-LP fix Transport format;
The installer will transpose the ECS-LP Fix in the Transport format to the Install format;
Add ECS-LP Fix Instance Description file to the distribution transport directory (see FIG. 5)
The above sequence registers the ECS-LP Fix description file with ECS-LP Fix transport format.
Distribute ECS-LP Fix in Transport format includes any of the following-CD-ROM image, Diskette image, Electronically or any equivalent means;

Install ECS-LP FIX from Transport format:
An install facility extracts and installs ECS-LP Fix functional files from Transport format
The ECS-LP Fix Instance Description file is installed from ECS-LP Fix Transport format by an install facility
This registers the ECS-LP Fix description file installed with ECS-LP Fix. (See FIGS. 2 and 5).

Retrieve ECS-LP Information API

Retrieval of ECS-LP Information API provides data in three formats:

1. Compressed list format
2. Expanded Registration Table format
3. Expanded Description file format Locates ECS-LP information based on parameters passed.

Retrieve ECS-LP PTF Information API

Retrieval of ECS-LP PTF Information API Provides data in three formats:

1. Compressed list format
2. Expanded Registration Table format
3. Expanded Description file format Locates ECS-LP PTF information based on parameters passed.

CONCLUSION

Since ECS-LP uses packaging files, these files may coexist with other packaging and registration protocols. ECS-LP registration API also provides a capability for registering ECS-LPs and ECS-LP Fixes into other desk top management facilities without forcing the application developer to write or distribute registration APIs with the application. The advantage of this approach is the application does not have to be redistributed each time a new registration management facility is installed or updated. Another advantage of this approach is ECS-LPs and their fixes can be registered in the transport format when it is not possible to activate application APIs.

A system and method has been shown in the above embodiments for a unique method to register and track software units. While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method of automatically tracking a plurality of computer software application packages in a computer file system, including an operating system and operating system file directories, comprising:

uniquely identifying said plurality of computer software application packages by a suffix value in said computer file system, said computer software application packages having a plurality of linked replaceable units;

creating a tracking directory recognizing said uniquely identified computer software application packages by said suffix value in said operating system;

monitoring said computer file system for operating system instructions to said operating system file directories;

detecting operating system instructions in said operating system file directories involving said uniquely identified computer software application packages by said suffix value; and updating said tracking directory in said operating system to reflect said operating system instructions in said uniquely identified computer software application packages having said suffix value.

2. The method of automatically tracking a plurality of computer software application packages per claim 1, wherein said application packages are tracked independent of file attribute capabilities of said operating system environment.

3. The method of automatically tracking a plurality of computer software application packages as per claim 1, wherein said uniquely identified software application packages are identified by a name and/or attribute.

4. The method of automatically tracking a plurality of computer software application packages as per claim 1, wherein said operating system instructions in said file directories comprise renaming, moving and/or deletion of directories.

5. The method of automatically tracking computer software as per claim 1, wherein said operating system instructions in said file directories comprise renaming, moving and/or deletion of files.

6. The method of automatically tracking computer software as per claim 1, wherein said tracking directory may be imported/exported to additional systems.

7. The method of automatically tracking computer software as per claim 1, wherein the method operates on local disk drives, network drives and/or removable media.

8. The method of automatically tracking computer software as per claim 1, wherein the computer software application packages comprise non-translatable software.

9. The method of automatically tracking computer software as per claim 1, wherein the computer software application packages comprise translatable software.

10. A method of automatically tracking the installation and distribution of replaceable computer software application packages in a computer file system, including an operating system and operating system file directories, comprising:

uniquely identifying said replaceable computer software application packages by a suffix value in said computer file system, said computer software application packages having a plurality of linked replaceable units;

creating a tracking directory recognizing said uniquely identified replaceable computer software application packages by said suffix value in said operating system;

monitoring said computer file system for operating system instructions to said operating system file directories;

detecting said operating system instructions in said operating system file directories involving said uniquely identified replaceable computer software application packages by said suffix value; and updating said tracing directory to reflect said operating system instructions in said uniquely identified replaceable computer software application packages having said suffix value.

11. The method of automatically tracking the installation and distribution of replaceable computer software application packages as per claim 10, wherein said replaceable computer software application packages are tracked independent of file attribute capabilities of said operating system environment.

12. The method of automatically tracking the installation and distribution of replaceable computer software application packages as per claim 10, wherein said uniquely identified replaceable computer software application packages are identified by a name and/or attribute.

13. The method of automatically tracking the installation and distribution of replaceable computer software application packages as per claim 10, wherein said operating system instructions in said file directories comprise renaming, moving and/or deletion of directories.

14. The method of automatically tracking the installation and distribution of replaceable computer software application packages as per claim 10, wherein said operating system instructions in said file directories comprise renaming, moving and/or deletion of files.

15. The method of automatically tracking the installation and distribution of replaceable computer software application packages as per claim 10, wherein said tracking directory may be imported/exported to additional systems.

16. The method of automatically tracking the installation and distribution of replaceable computer software application packages as per claim 10, wherein the method operates on local disk drives, network drives and/or removable media.

17. The method of automatically tracking the installation and distribution of replaceable computer software application packages as per claim 10, wherein the replaceable computer software application packages comprise non-translatable software.

18. The method of automatically tracking the installation and distribution of replaceable computer software application packages as per claim 10, wherein the replaceable computer software application packages comprise translatable software.

19. A method of automatically registering and tracking the installation and distribution of replaceable computer software application packages in a computer file system, including an operating system and file directories, comprising:

uniquely identifying said replaceable computer software application packages by a suffix value and including name and/or attributes, said computer software application packages having a plurality of linked replaceable units;

creating a product tracking directory recognizing said uniquely identified replaceable computer software application packages by said suffix value;

monitoring said computer file system for modifications by said operating system to said operating system file directories;

detecting said modifications in said operating system file directories involving said uniquely identified replaceable computer software application packages by said suffix value; and updating said product tracking directory to reflect said modifications in said uniquely identified replaceable computer software application packages having said suffix value.

20. The method of automatically registering and tracking the installation and distribution of replaceable computer software application packages in a computer file system as per claim 19, wherein said unique identification of said replaceable computer software application packages further comprises appending a distinct file name suffix.

21. The method of automatically registering and tracking the installation and distribution of replaceable computer software application packages in a computer file system as per claim 19, wherein said replaceable computer software application packages are registered and tracked independent of file attribute capabilities of a resident operating system environment.

22. The method of automatically registering and tracking the installation and distribution of replaceable computer software application packages in a computer file system as per claim 19, wherein said modifications in said file directories comprise renaming, moving and/or deletion of directories.

23. The method of automatically registering and tracking the installation and distribution of replaceable computer software application packages in a computer file system as per claim 19, wherein said modifications in said file directories comprise renaming, moving and/or deletion of files.

24. The method of automatically registering and tracking the installation and distribution of replaceable computer software application packages in a computer file system as per claim 19, wherein said tracking directory may be imported/exported to additional systems.

25. The method of automatically registering and tracking the installation and distribution of replaceable computer software application packages in a computer file system as per claim 19, wherein the method operates on local disk drives, network drives and/or removable media.

* * * * *